US008036692B2

(12) United States Patent
Ayyasamy et al.

(10) Patent No.: US 8,036,692 B2
(45) Date of Patent: \*Oct. 11, 2011

(54) BREW PLATFORM ENABLING ADVANCED VOICE SERVICES (AVS) INCLUDING PUSH-TO-TALK, PUSH-TO-CONFERENCE AND PUSH-TO-MESSAGE ON WIRELESS HANDSETS AND NETWORKS

(75) Inventors: Ravi Ayyasamy, Richardson, TX (US);
Krishnakant M. Patel, Richardson, TX (US)

(73) Assignee: Kodiaks Networks, Inc., San Ramon, CA (US)

( * ) Notice: Subject to any disclaimer, the term of this patent is extended or adjusted under 35 U.S.C. 154(b) by 36 days.

This patent is subject to a terminal disclaimer.

(21) Appl. No.: 11/463,186

(22) Filed: Aug. 8, 2006

(65) Prior Publication Data
US 2007/0037598 A1    Feb. 15, 2007

Related U.S. Application Data

(60) Provisional application No. 60/706,265, filed on Aug. 8, 2005.

(51) Int. Cl.
*H04B 7/00* (2006.01)
(52) U.S. Cl. ............ 455/518; 455/414.1; 455/416; 455/519
(58) Field of Classification Search ........ 455/414.1, 455/518, 519, 416, 418–419, 428, 445, 422.1
See application file for complete search history.

(56) References Cited

U.S. PATENT DOCUMENTS

| 3,912,874 A | 10/1975 | Botterell et al. |
| 4,796,293 A | 1/1989 | Blinken et al. |
| 5,353,328 A | 10/1994 | Jokimies |
| 5,442,809 A | 8/1995 | Diaz et al. |
| 5,546,449 A | 8/1996 | Hogan et al. |
| 5,711,011 A | 1/1998 | Urs et al. |
| 5,987,318 A | 11/1999 | Alperovich et al. |
| 5,987,331 A | 11/1999 | Grube et al. |

(Continued)

FOREIGN PATENT DOCUMENTS
GB    2338150    12/1999

(Continued)

OTHER PUBLICATIONS

ETSI: "ETSI TS 100 812-2 v2.3.1 Terrestrial Trunked Radio (TETRA) Subscriber Identity Module to Mobile Equipment (SIM-ME) interface; Part 2: Universal Integrated Circuit Card (UICC) Characteristics of the TSIM application", ETSI Technical Specification, Oct. 2003, pp. 1-141. XP002345779.

(Continued)

*Primary Examiner* — Nick Corsaro
*Assistant Examiner* — Chuong A Ngo
(74) *Attorney, Agent, or Firm* — Gates & Cooper LLP

(57) ABSTRACT

A client application that provides advanced voice services (AVS), such as Push-to-Talk (P2T), Push-to-Conference (P2C), Upgrade to Conference (upgrade from P2T to P2C), Push-to-Message (P2M) and group SMS (Short Message Service), on wireless handsets and networks using a Binary Runtime Environment for Wireless (BREW™), which is an open architecture that serves as a common platform for wireless applications. The functionality provided by the BREW™ AVS client application includes menu displays for the handset, as well as user interaction with the menu displays. Specifically, the functionality includes One-to-One Conference Calls, One-to-Many Conference Calls, Dynamic Conference Calls, One-to-One Messaging, or One-to-Many Messaging.

10 Claims, 5 Drawing Sheets

U.S. PATENT DOCUMENTS

| | | | |
|---|---|---|---|
| 6,011,976 | A | 1/2000 | Michaels et al. |
| 6,021,326 | A | 2/2000 | Nguyen |
| 6,138,011 | A | 10/2000 | Sanders, III et al. |
| 6,192,119 | B1 | 2/2001 | Wilson |
| 6,304,558 | B1 | 10/2001 | Mysore |
| 6,397,054 | B1 | 5/2002 | Hoirup et al. |
| 6,405,030 | B1 | 6/2002 | Suprunov |
| 6,411,815 | B1 | 6/2002 | Balasuriya |
| 6,477,366 | B1 | 11/2002 | Valentine et al. |
| 6,477,387 | B1 | 11/2002 | Jackson et al. |
| 6,549,773 | B1 | 4/2003 | Linden et al. |
| 6,577,874 | B1 | 6/2003 | Dailey |
| 6,606,305 | B1 | 8/2003 | Boyle et al. |
| 6,628,937 | B1 | 9/2003 | Salin |
| 6,661,878 | B1 | 12/2003 | Mirashrafi et al. |
| 6,751,468 | B1 | 6/2004 | Heubel et al. |
| 6,801,762 | B1 | 10/2004 | Huilgol |
| 6,856,676 | B1 | 2/2005 | Pirot et al. |
| 6,865,398 | B2 | 3/2005 | Mangal et al. |
| 6,892,074 | B2 | 5/2005 | Tarkiainen et al. |
| 6,895,254 | B2 | 5/2005 | Dorenbosch |
| 6,898,436 | B2 | 5/2005 | Crockett et al. |
| 6,996,414 | B2 | 2/2006 | Vishwanathan et al. |
| 7,026,926 | B1 | 4/2006 | Walker, III |
| 7,043,266 | B2 | 5/2006 | Chaturvedi et al. |
| 7,085,364 | B1 | 8/2006 | Ahmed et al. |
| 7,099,291 | B2 | 8/2006 | Harris et al. |
| 7,170,863 | B1 | 1/2007 | Denman et al. |
| 7,231,225 | B2 | 6/2007 | Rao et al. |
| 7,236,580 | B1 | 6/2007 | Sarkar et al. |
| 7,366,535 | B2 | 4/2008 | Glass et al. |
| 7,403,775 | B2 * | 7/2008 | Patel et al. ............... 455/432.1 |
| 7,529,557 | B2 | 5/2009 | Farrill |
| 7,689,238 | B2 * | 3/2010 | Biswas et al. ................ 455/518 |
| 2001/0005372 | A1 | 6/2001 | Cave et al. |
| 2002/0077136 | A1 | 6/2002 | Maggenti et al. |
| 2002/0086659 | A1 | 7/2002 | Lauper |
| 2002/0196781 | A1 | 12/2002 | Salovuori |
| 2003/0016632 | A1 | 1/2003 | Refai et al. |
| 2003/0017836 | A1 | 1/2003 | Vishwanathan et al. |
| 2003/0078064 | A1 | 4/2003 | Chan |
| 2003/0148779 | A1 | 8/2003 | Aravamudan et al. |
| 2003/0153343 | A1 | 8/2003 | Crockett et al. |
| 2003/0190888 | A1 | 10/2003 | Mangal et al. |
| 2004/0032843 | A1 | 2/2004 | Schaefer et al. |
| 2004/0057449 | A1 | 3/2004 | Black |
| 2004/0067751 | A1 | 4/2004 | Vandermeijden et al. |
| 2004/0095954 | A1 | 5/2004 | Varney et al. |
| 2004/0152441 | A1 | 8/2004 | Wong |
| 2004/0179531 | A1 | 9/2004 | Bi et al. |
| 2004/0196826 | A1 | 10/2004 | Bao et al. |
| 2004/0203793 | A1 | 10/2004 | Dorenbosch |
| 2004/0224710 | A1 | 11/2004 | Koskelainen et al. |
| 2004/0228292 | A1 | 11/2004 | Edwards |
| 2004/0259580 | A1 | 12/2004 | Florkey et al. |
| 2005/0047362 | A1 | 3/2005 | Harris et al. |
| 2005/0101308 | A1 * | 5/2005 | Lee ............................ 455/416 |
| 2005/0111430 | A1 | 5/2005 | Spear et al. |
| 2005/0143135 | A1 * | 6/2005 | Brems et al. ................ 455/564 |
| 2005/0164737 | A1 | 7/2005 | Brown |
| 2005/0189337 | A1 | 9/2005 | Baune |
| 2005/0192041 | A1 * | 9/2005 | Oxley et al. ................. 455/519 |
| 2005/0202807 | A1 | 9/2005 | Ayyasamy et al. |
| 2005/0221819 | A1 | 10/2005 | Patel et al. |
| 2005/0232241 | A1 | 10/2005 | Wu et al. |
| 2005/0239485 | A1 * | 10/2005 | Kundu et al. ................ 455/519 |
| 2005/0254464 | A1 | 11/2005 | Patel et al. |
| 2005/0261016 | A1 * | 11/2005 | Patel et al. ................. 455/518 |
| 2006/0003751 | A1 * | 1/2006 | Vo ............................ 455/414.1 |
| 2006/0019654 | A1 | 1/2006 | Farrill |
| 2006/0029189 | A1 | 2/2006 | Patel et al. |
| 2006/0030347 | A1 | 2/2006 | Biswaas |
| 2006/0056361 | A1 | 3/2006 | Jiang et al. |
| 2006/0078064 | A1 | 4/2006 | Schmidt et al. |
| 2006/0094455 | A1 * | 5/2006 | Hannu et al. ................ 455/518 |
| 2006/0116150 | A1 | 6/2006 | Bhutiani |
| 2006/0189337 | A1 * | 8/2006 | Farrill et al. ................ 455/518 |
| 2006/0234687 | A1 | 10/2006 | Patel et al. |
| 2007/0037597 | A1 * | 2/2007 | Biswas et al. ................ 455/518 |
| 2007/0037598 | A1 | 2/2007 | Ayyasamy et al. |
| 2007/0190984 | A1 | 8/2007 | Ayyasamy et al. |
| 2007/0197234 | A1 | 8/2007 | Gill et al. |
| 2007/0253347 | A1 | 11/2007 | Patel et al. |
| 2008/0064364 | A1 | 3/2008 | Patel et al. |
| 2009/0092116 | A1 | 4/2009 | Jiang et al. |
| 2009/0149167 | A1 | 6/2009 | Patel et al. |
| 2009/0209235 | A1 | 8/2009 | Lawler et al. |

FOREIGN PATENT DOCUMENTS

| | | |
|---|---|---|
| WO | 00/69189 | 11/2000 |
| WO | 00/79825 | 12/2000 |
| WO | 01/67674 | 9/2001 |
| WO | 03/101007 | 12/2003 |
| WO | WO 03101007 A1 * | 12/2003 |
| WO | 2005/009006 | 1/2005 |
| WO | WO 2005009006 A2 * | 1/2005 |
| WO | 2005/112494 | 11/2005 |
| WO | 2005/115032 | 12/2005 |
| WO | 2005/117474 | 12/2005 |
| WO | 2006/105287 | 10/2006 |
| WO | 2010/048217 | 4/2010 |
| WO | 2010/117815 | 10/2010 |

OTHER PUBLICATIONS

Nokia: "What is TETRA? Why Nokia TETRA?", The Nokia TETRA Primer, 2002, pp. 1-29. XP002345778 http://www.nokia.com/downloads/solutions/government/SD114EN_gov.pdf.

Skype: "Skype". Web Archive—Skype, May 22, 2004, pp. 1-2. XP002345780 http://web.archive.org/web/20040522201727 http://www.skype.com.

Trachwell: "TrackWell Software and Tetra Iceland deliver value added services to Tetra users", Trackwell.com, Oct. 2002, pp. 1-1. XP002345781 http://www.trackwell.com/news/news_twandtetra.htm.

ETSI: "ETSI TS 100 812-2 v2.3.1 Terrestrial Trunked Radio (TETRA) Subscriber Identity Module to Mobile Equipment (SIM-ME) interface; Part 2: Universal Integrated Circuit Card (UICC) Characteristics of the TSIM application", ETSI Technical Specification, Oct. 2003, pp. 1-141. XP002345779.

Nokia: "What is TETRA? Why Nokia TETRA?", The Nokia TETRA Primer, 2002, pp. 1-29. XP002345778 http://www.nokia.com/downloads/solutions/government/SD114EN_gov.pdf.

Skype: "Skype". Web Archive—Skype, May 22, 2004, pp. 1-2. XP002345780 http:/ /web.archive.org/web/20040522201727 http://www.skype.com.

Trachwell: "TrackWell Software and Tetra Iceland deliver value added services to Tetra users", Trackwell.com, Oct. 2002, pp. 1-1. XP002345781 http:/ /www.trackwell.com/news/news_twandtetra.htm.

* cited by examiner

BREW PLATFORM ENABLING ADVANCED VOICE SERVICES (AVS) INCLUDING PUSH-TO-TALK, PUSH-TO-CONFERENCE AND PUSH-TO-MESSAGE ON WIRELESS HANDSETS AND NETWORKS

CROSS REFERENCE TO RELATED APPLICATIONS

This application claims the benefit under 35 U.S.C. Section 119(e) of the following and commonly-assigned U.S. provisional patent application:

Ser. No. 60/706,265, filed on Aug. 8, 2005, by Ravi Ayyasamy and Krishnakant M. Patel, entitled "ADVANCED VOICE SERVICES CLIENT FOR BREW PLATFORM,";

which application is incorporated by reference herein.

This application is related to the following co-pending and commonly-assigned patent applications:

U.S. Utility application Ser. No. 10/515,556, filed Nov. 23, 2004, by Gorachand Kundu, Ravi Ayyasamy and Krishnakant Patel, entitled "DISPATCH SERVICE ARCHITECTURE FRAMEWORK,", which application claims the benefit under 35 U.S.C. Section 365 of PCT International Patent Application Serial Number PCT/US03/16386, which application claims the benefit under 35 U.S.C. Section 119(e) of U.S. Provisional Patent Application Ser. Nos. 60/382,981, 60/383,179 and 60/407,168;

U.S. Utility application Ser. No. 10/564,903, filed Jan. 17, 2006, by F. Craig Farrill, Bruce D. Lawler and Krishnakant M. Patel, entitled "PREMIUM VOICE SERVICES FOR WIRELESS COMMUNICATIONS SYSTEMS,", which application claims the benefit under 35 U.S.C. Section 365 of PCT International Patent Application Serial Number PCT/US04/23038, which application claims the benefit under 35 U.S.C. Section 119(e) of U.S. Provisional Patent Application Ser. Nos. 60/488,638, 60/492,650 and 60/576,094 and which application is a continuation-in-part and claims the benefit under 35 U.S.C. Section 119, 120 and/or 365 of PCT International Patent Application Serial Number PCT/US03/16386;

U.S. patent application Ser. No. 11/126,587, filed May 11, 2005, by Ravi Ayyasamy and Krishnakant M. Patel, entitled "ARCHITECTURE, CLIENT SPECIFICATION AND APPLICATION PROGRAMMING INTERFACE (API) FOR SUPPORTING ADVANCED VOICE SERVICES (AVS) INCLUDING PUSH TO TALK ON WIRELESS MS 120 AND NETWORKS," which application claims the benefit under 35 U.S.C. Section 119(e) of U.S. Provisional Patent Application Ser. Nos. 60/569,953 and 60/579,309, and which application is a continuation-in-part and claims the benefit under 35 U.S.C. Sections 119, 120 and/or 365 of U.S. Utility patent application Ser. No. 10/515,556 and PCT International Patent Application Serial Number PCT/US04/23038;

U.S. Utility patent application Ser. No. 11/129,268, filed May 13, 2005, by Krishnakant M. Patel, Gorachand Kundu, Ravi Ayyasamy and Basem Ardah, entitled "ROAMING GATEWAY FOR SUPPORT OF ADVANCED VOICE SERVICES WHILE ROAMING IN WIRELESS COMMUNICATIONS SYSTEMS,", which application claims the benefit under 35 U.S.C. Section 119(e) of U.S. Provisional Patent Application Ser. No. 60/571,075, and which application is a continuation-in-part and claims the benefit under 35 U.S.C. Sections 119, 120 and/or 365 of U.S. Utility patent application Ser. No. 10/515,556 and P.C.T. International Patent Application Serial Number PCT/US04/23038;

U.S. Utility patent application Ser. No. 11/134,883, filed May 23, 2005, by Krishnakant Patel, Vyankatesh V. Shanbhag, Ravi Ayyasamy, Stephen R. Horton and Shan-Jen Chiou, entitled "ADVANCED VOICE SERVICES ARCHITECTURE FRAMEWORK,", which application claims the benefit under 35 U.S.C. Section 119(e) of U.S. Provisional Patent Application Ser. No. 60/573,059 and 60/576,092, and which application is a continuation-in-part and claims the benefit under 35 U.S.C. Sections 119, 120 and/or 365 of U.S. Utility patent application Ser. No. 10/515,556, P.C.T. International Patent Application Serial Number PCT/US04/23038, U.S. Utility patent application Ser. No. 11/126,587, and U.S. Utility patent application Ser. No. 11/129,268; and U.S. Utility patent application Ser. No. 11/136,233, filed May 24, 2005, by Krishnakant M. Patel, Vyankatesh Vasant Shanbhag, and Anand Narayanan, entitled "SUBSCRIBER INFORMATION MODULE (SIM) ENABLING ADVANCED VOICE SERVICES (AVS) INCLUDING PUSH TO TALK ON WIRELESS MS 120 AND NETWORKS,", which application claims the benefit under 35 U.S.C. Section 119(e) of U.S. Provisional Patent Application Ser. No. 60/573,780, and which application is a continuation-in-part and claims the benefit under 35 U.S.C. Sections 119, 120 and/or 365 of U.S. Utility patent application Ser. No. 10/515,556, P.C.T. International Patent Application Serial Number PCT/US04/23038, U.S. Utility patent application Ser. No. 11/126,587, and U.S. Utility patent application Ser. No. 11/134,883;

U.S. Utility patent application Ser. No. 11/158,527, filed Jun. 22, 2005, by F. Craig Farrill, entitled "PRESS-TO-CONNECT FOR WIRELESS COMMUNICATIONS SYSTEMS," which application claims the benefit under 35 U.S.C. Section 119(e) of U.S. Provisional Patent Application Ser. No. 60/581,954, and which application is a continuation-in-part and claims the benefit under 35 U.S.C. Sections 119, 120 and/or 365 of U.S. Utility patent application Ser. No. 10/515,556 and P.C.T. International Patent Application Serial Number PCT/US04/23038;

U.S. Utility patent application Ser. No. 11/183,516, filed Jul. 18, 2005, by Deepankar Biswaas, entitled "VIRTUAL PUSH TO TALK (PTT) AND PUSH TO SHARE (PTS) FOR WIRELESS COMMUNICATIONS SYSTEMS," which application claims the benefit under 35 U.S.C. Section 119(e) of U.S. Provisional Patent Application Ser. No. 60/588,464; and U.S. Utility patent application Ser. No. 11/356,775, filed Feb. 17, 2006, by Krishnakant M. Patel, Bruce D. Lawler, Giridhar K. Boray, and Brahmananda R. Vempati, entitled "ENHANCED FEATURES IN AN ADVANCED VOICE SERVICES (AVS) FRAMEWORK FOR WIRELESS COMMUNICATIONS SYSTEMS," which application claims the benefit under 35 U.S.C. Section 119(e) of U.S. Provisional Patent Application Ser. No. 60/654,271;

PCT International Patent Application Serial Number PCT/US2006/011628, filed Mar. 30, 2006, by Krishnakant M. Patel, Gorachand Kundu, Sameer Dharangaonkar, Giridhar K. Boray, and Deepankar Biswas, entitled "TECHNIQUE FOR IMPLEMENTING ADVANCED VOICE SERVICES USING AN UNSTRUCTURED SUPPLEMENTARY SERVICE DATA (USSD) INTERFACE," which application claims the benefit under 35 U.S.C. Section 119(e) of U.S. Provisional Patent Application Ser. No. 60/666,424;

all of which applications are incorporated by reference herein.

BACKGROUND OF THE INVENTION

1. Field of the Invention

This invention relates in general to wireless communications systems, and more specifically, to a BREW™ client application enabling Advanced Voice Services (AVS) including Push-to-Talk (P2T), Push-to-Conference (P2C) and Push-to-Message (P2M) on wireless handsets and networks.

2. Description of Related Art

Group-based voice services, such as two-way half-duplex voice calls within a group or between individuals, also known as "Push-to-Talk," "Press-to-Talk," PTT or P2T, have enormous revenue earnings potential for wireless networks, such as cellular phone networks and personal communications systems (PCS) networks, which are mobile phone networks.

Moreover, the Assignee has introduced Advanced Voice Services (AVS) including improved implementations for P2T, as well as novel group-based voice services such as Push-to-Conference (P2C), Upgrade to Conference (upgrade from P2T to P2C), Push-to-Message (P2M) and group SMS (Short Message Service), for wireless handsets and networks. More information on these advanced voice services can be found in the cross-referenced applications identified above.

To support these advanced voice services, improved handsets are required. Previously, the Assignee has introduced an architecture, client specification and application programming interface (API) for supporting AVS, as well as a Subscriber Identity Module (SIM) for supporting AVS. More information on these concepts can be found in the cross-referenced applications identified above.

However, there is also a need for handsets that support AVS that are based on the Binary Runtime Environment for Wireless (BREW™) solution offered by Qualcomm, Inc., which is an open architecture that serves as a common platform for wireless applications. More specifically, there is a need in the art for BREW-enabled handsets that support advanced voice services, such as Push-to-Talk (P2T), Push-to-Conference (P2C), Upgrade to Conference (upgrade from P2T to P2C), Push-to-Message (P2M) and other advanced voice services. The present invention aims to satisfy this need.

SUMMARY OF THE INVENTION

To overcome the limitations in the prior art described above, and to overcome other limitations that will become apparent upon reading and understanding the present specification, the present invention discloses a BREW™ AVS client application that provides AVS, such as Push-to-Talk (P2T), Push-to-Conference (P2C), Upgrade to Conference (upgrade from P2T to P2C), Push-to-Message (P2M) and group SMS (Short Message Service), on wireless handsets and networks. The functionality provided by the BREW™ AVS client application includes menu displays for the handset, as well as user interaction with the menu displays. Specifically, the functionality includes 1:1 Conference Calls, 1:Many Conference Calls, Dynamic Conference Calls, 1:1 Messaging, or 1:Many Messaging.

BRIEF DESCRIPTION OF THE DRAWINGS

Referring now to the drawings in which like reference numbers represent corresponding parts throughout.

DETAILED DESCRIPTION OF THE INVENTION

In the following description of the preferred embodiment, reference is made to the accompanying drawings which form a part hereof, and in which is shown by way of illustration the specific embodiment in which the invention may be practiced. It is to be understood that other embodiments may be utilized as structural changes may be made without departing from the scope of the present invention.

Overview

The present invention describes a BREW™ enabled handset for providing advanced voice services (AVS), and more specifically, a BREW™ AVS client application that provides AVS functionality, such as Push-to-Talk (P2T), Push-to-Conference (P2C), Upgrade to Conference (upgrade from P2T to P2C), Push-to-Message (P2M) and group SMS (Short Message Service), on wireless handsets and networks. This AVS functionality includes menu displays for the handset, as well as user interaction with the menu displays. The BREW™ AVS client application also provides presence and availability functions on the handset. In addition, the BREW™ AVS client application provides contact and group management on the handset.

Network Architecture

Figure 1:
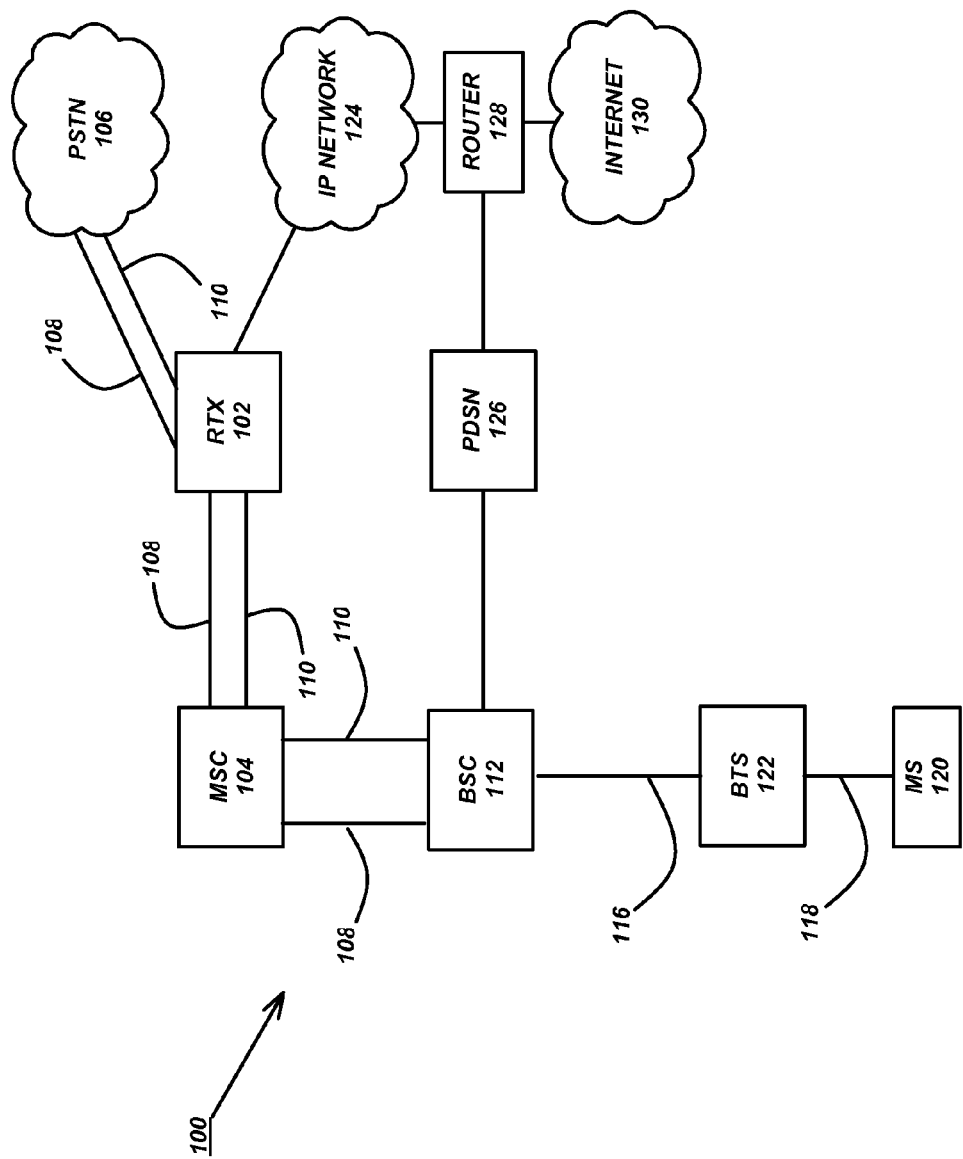
FIG. 1 is a block diagram that illustrates an exemplary embodiment of a wireless communications network according to a preferred embodiment of the present invention.

FIG. 1 is a block diagram that illustrates an exemplary embodiment of a wireless communications network according to a preferred embodiment of the present invention.

Within the network 100, an RTX (Real-Time Exchange) 102, previously known as a Dispatch Gateway (DG), communicates with a MSC (Mobile Switching Center) 104 and PSTN (Public Switched Telephone Network) 106 using SS7—ISUP/WIN/CAMEL (Signaling System 7—Integrated Services Digital Network User Part/Wireless Intelligent Network/Customized Applications for Mobile Enhanced Logic) messages at a signaling plane 108. A bearer path 110 implements a TDM (Time Division Multiplexing) interface carrying PCM (Pulse Code Modulation) or TFO (Tandem Free Operation) voice frames. Support for TFO in this path 110 is negotiated between a BSC (Base Station Controller) 112 and the RTX 102 for each originating and terminating leg of an AVS call. The use of TFO ensures high voice quality (as voice vocoder conversion is avoided) between mobile-to-mobile calls.

When a subscriber originates an AVS call, the MSC 104 routes the call to the RTX 102. The MSC 104 also requests the BSC 112 via 116 to establish a radio traffic path 118 with a mobile station (MS) 120 (also known as a handset or mobile unit) via the BTS (Base Transceiver Station) 122 (as it does for a normal cellular call). At this time, the BSC 112 tries to negotiate TFO (if it is supported) on a TDM link with the far end (in this case, the RTX 102).

At the same time (after the MSC 104 terminates the group call request to the RTX 102), the RTX 102 identifies the terminating group users and their MS-ISDN (Mobile Station—Integrated Services Digital Network) numbers. It sends an ISUP call origination request for each terminating MS 120. It may send requests directly to the MSC 104, PSTN 106 or IP network 124 via a PDSN (Public Data Switched Network) 126, Router 128, and/or Internet/Intranet 130, depending on the routing table configuration for terminating MS-ISDN numbers. Once the bearer path 110 is established, the RTX 102 begins a negotiation with the far end (in this case, the terminating BSC 112) for each terminating leg to a MS 120.

Once bearer paths 110 are established for originating and terminating legs for an AVS call, the RTX 102 switches (or duplicates) voice frames from the originating MS 120 to all terminating MS's 120.

The RTX 102 may use an IP network 124 or the Internet/Intranet 130 for two different purposes. The IP network 124 or the Internet/Intranet 130 can be used in a toll bypass mode where two RTXs 102 can exchange voice traffic bypassing the PSTN 106. However, each RTX 102 is responsible for terminating traffic to its closest MSC 104. In this case, the IP network 124 or the Internet/Intranet 130 is used as a backbone transport of voice traffic between two RTXs 102.

The IP network 124 or the Internet/Intranet 130 can also be used for a registration and presence application. Since the MSC 104 will not direct a registration request from a MS 120 to the RTX 102 (because it would require changes in the MSC 104), the latter does not have any information of the registered MS 120. To circumvent this issue, a registration and presence application runs over an IP stack in the MS 120. After the MS 120 registers for a data interface (i.e., obtaining an IP address) with the PDSN 126 (or Serving GSM Service Nodes (SGSN) in the case of GSM networks), the registration and presence application in the MS 120 registers with the RTX 102 using its IP address. The RTX 102 also uses this IP interface to update the presence information of other group members to a MS 120.

An alternative embodiment would use the SMS (Short Message Service) transport to carry presence messages over a data channel. The RTX 102 interacts with the MS 120 using predefined presence application related messages that are transported as SMS messages. The same messages can be transported via the PDSN 126 interface, if group users have data service.

Real Time Exchange

Figure 2:
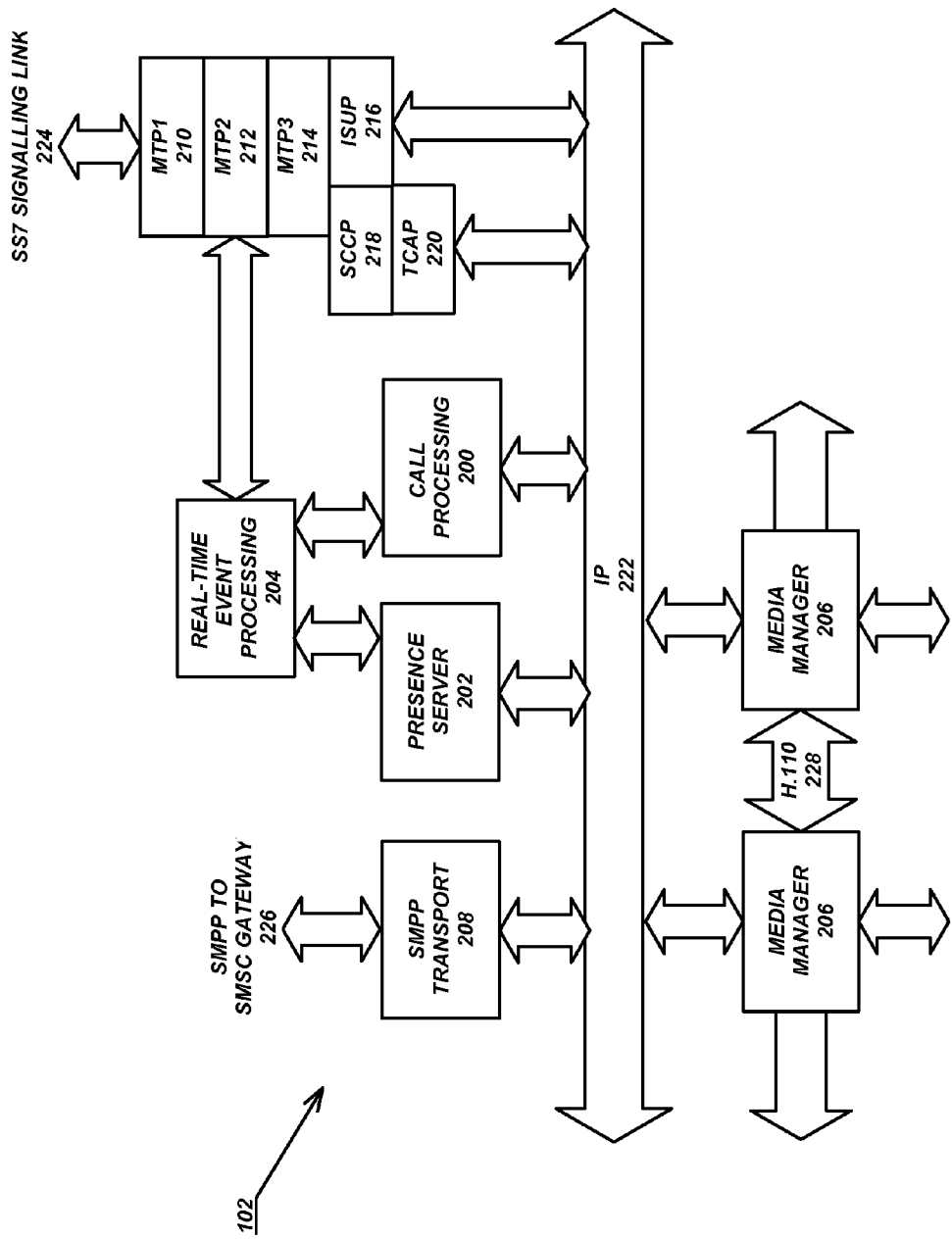
FIG. 2 illustrates a proposed architecture for a real-time exchange according to the preferred embodiment of the present invention.

FIG. 2 illustrates a proposed architecture for the RTX 102 according to the preferred embodiment of the present invention.

The architecture includes a Call Processing system 200, Presence Server 202, Real-Time Event Processing system 204, one or more Media Managers 206, and an SMPP (Short Message Peer-to-Peer) Transport 208, as well as modules for various SS7 protocols, such as MTP-1 (Message Transfer Part Level 1) 210, MTP-2 (Message Transfer Part Level 2) 212, MTP-3 (Message Transfer Part Level 3) 214, ISUP (Integrated Services Digital Network User Part) 216, SCCP (Signaling Connection Control Part) 218, and TCAP (Transactions Capabilities Application Part) 220 protocols.

The Call Processing system 200, Presence Server 202, Media Managers 204, SMPP Transport 206, and other modules communicate across an IP network 222. The Real-Time Event Processing system 204 communicates directly with the Call Processing system 200, Presence Server 202, and the modules for various SS7 protocols. The modules for various SS7 protocols communicate with other entities via a SS7 Signaling Link 224. The SMPP Transport 206 communicates with a SMSC (Short Message Service Center) gateway using the SMPP protocol 226. The Media Managers 204 communicate among themselves using the H.110 protocol 228 (or some other protocol, such TCP/IP).

The operation of these various components are described in more detail below, as well as in the co-pending and commonly-assigned patent applications cross-referenced above and incorporated by reference herein.

The originating MS 120 signals the RTX 102 via the wireless network 100, e.g., by transmitting one or more configured DTMF (Dual Tone Multi Frequency) digits to the RTX 102. The Media Manager systems 206 receive the DTMF digits and pass the DTMF digits to the Call Processing system 200. The Call Processing (CP) system 200 determines whether the originating MS 120 has subscribed to the AVS feature before originating the AVS call. Upon confirmation, the Call Processing system 200 initiates a new AVS call. The Call Processing system 200 interacts with the Presence Server 202 and Real-Time Event Processing system 204 to cause the wireless network 100 to perform call setup with the terminating MS's 120 for the AVS call, and thereafter to manage the AVS call.

During the AVS call, the Call Processing system 200 interacts with the Media Manager systems 206 to maintain the H.110 channels 227 and assign any additional H.110 channels 228 required for the AVS call, which may span across multiple Media Manager systems 206. During the AVS call, the Media Manager systems 206 of the RTX 102 are used to mix audio streams between the originating MS 120 and the terminating MS 120, and then deliver these mixed audio streams to the originating MS 120 and the terminating MS 120. The H.110 channels 228 are used for passing mixed and unmixed audio streams voice between the Media Manager systems 200 as required.

Mobile Station Components

Figure 3:
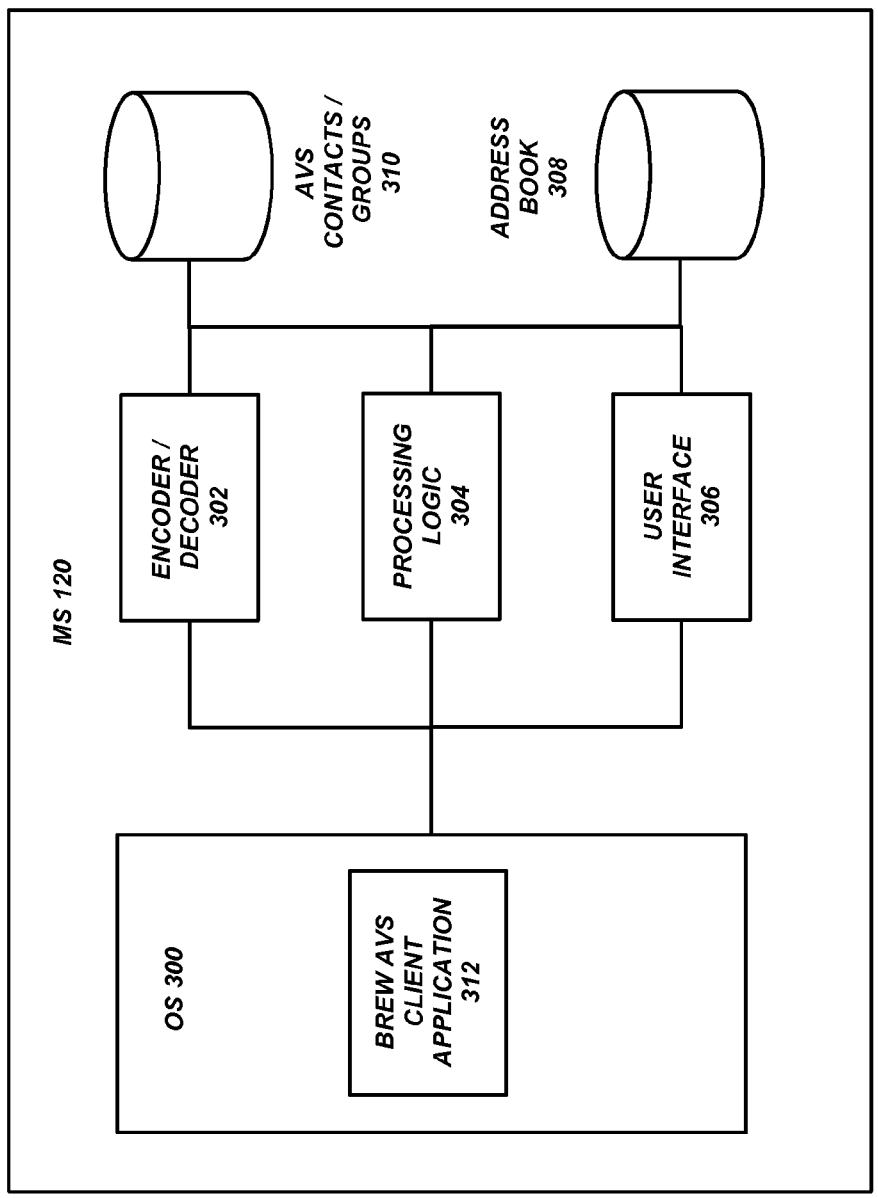
FIG. 3 illustrates the high-level functional components and their interfaces for a mobile station or handset according to a preferred embodiment of the present invention.

FIG. 3 illustrates the high-level functional components and their interfaces in the MS 120 according to a preferred embodiment of the present invention.

The high-level functional components of the MS 120 includes an operating system (OS) 300 stored in memory, encoder/decoder 302, processing logic 304 and user interface 306, wherein the encoder/decoder 302, processing logic 304 and user interface 306 interface to the OS 300 of the MS 120 in order to perform their functions. In addition, the MS 120 provides an address book database 308 and an AVS contacts/groups database 310. Under the control of the OS 300, a BREW™ AVS client application 312 is executed by the MS 120 that provides AVS functionality for the MS 120.

At power-on, the MS 120 loads the OS 300 as well as the BREW™ AVS client application 312 necessary to support the AVS features. This functionality provided includes the "look and feel" of the menu displays on the MS 120, as well as user interaction with the menu displays.

During operation, the encoder/decoder 302 decodes and encodes messages, and populates specific data structures in the MS 120. The encoder/decoder 302 checks the validity of the incoming messages by verifying mandatory parameters for each of the incoming messages. A message will not be processed further if the encoder/decoder 302 fails to decode the message.

The processing logic 304 handles all the AVS related functionalities, such as Group/Private/Dynamic Group calls. The processing logic 304 implementation is device-specific and vendor-specific, and it interacts with the other components, including the encoder/decoder 302, user interface 306, address book database 308 or AVS contacts/group database 310.

The processing logic 304 provides an auto-answer mechanism for AVS calls. Specifically, when a call is received, the processing logic 304 automatically answers the call. The processing logic 304 makes use of call notification for incoming call detection and, based on various parameters received within the call notification, determines whether the call is an AVS call. If the call is an AVS call, then the processing logic 304 uses "AT" commands to answer the AVS call and turn on the speaker of the MS 120. (All of this takes place within a certain time period.) On the other hand, if the call is not an AVS call, then normal call processing is performed by the MS 120.

The processing logic 304 also provides "floor control" using DTMF tone control. In P2T calls, which are half-duplex, a determination of who may talk is based on who has the "floor." Using the processing logic 304 provided in the MS 120, appropriate DTMF tones are sent to the RTX 102 in accordance with specific key sequences (i.e., pressing and/or releasing a P2T key) that indicate whether the "floor" has been requested and/or released by the user.

In addition, the processing logic 304 provides SMS destination control based on the type of subscriber. At the time of subscriber data provisioning, if it is determined that the MS 120 will use AVS based logic, then appropriate logic is invoked in the RTX 102 to send presence messages over SMS to the MS 120. Similarly, the MS 120 is configured at the time of provisioning to receive/accept such SMS and respond to the RTX 102 appropriately.

Finally, the processing logic 304 also enables subscribers to track the presence of fellow members of the group in the network 100 on their MS 120, and provides a mechanism and API to carry-out contacts and group management operations on the MS 120, such as add member, delete member, etc.

Since most of the presence information is stored in the database 310, the database 310 is tightly integrated with the processing logic 304. The database 310 stores groups, contacts, presence and availability related information. The database 310 information essentially contains group and member information along with presence information associated with each group and member. Apart from group and member information, the database 310 also stores subscriber information, such as privileges, presence information, etc. The other components of the MS 120 may interact with the database 310 to retrieve/update the group, members and presence information for various operations. The database 310 also has pointers to the native address book database 308 on the MS 120, to provide seamless "alias" naming for contacts used with cellular calls, as well as AVS features.

The user interface 306 provides a mechanism for the user to view and manage groups, group members, contacts, presence and availability. The user interface 306 also makes it possible to invoke the AVS features from the group/contact list screens, as described in more detail below.

Client Application

The BREW™ AVS client application 312 enables users to communicate instantly (i.e., in real-time) among group members. This service is provided on wireless MS 120 that have a Push-to-talk (PTT) button and speaker capability. AVS calls include PTT calls, Voice Bridge (Instant Conference) and Voice Notes (Instant Voice Message).

The BREW™ AVS client application 312 is a downloadable over-the-air (OTA) application, for the BREW-enabled MS 120. The BREW™ AVS client application 312 can be downloaded over-the-air (OTA) and requires no handset replacement. The suite of functions provided by the BREW™ AVS client application 312 includes Voice Bridge (instant group conferencing), Voice Notes (instant voice messaging for individuals and groups), and Instant Availability.

Specifically, using the BREW™ AVS client application 312, the MS 120 can perform following operations:

Private AVS calls—An AVS subscriber can make an instant P2T call to another AVS subscriber.

Group AVS calls—An AVS subscriber can make a group call.

Dynamic Group AVS calls—An AVS subscriber can select members in a group and call only those members.

Voice Notes—Allows for instant voice messaging from AVS-enabled MS 120 to contacts/groups with wireless or landline phones.

Instant availability—Indicates real-time user availability to receive wireless calls. Availability states include "available," "do not disturb," and "offline."

Quick groups—Provides users with the ability to select members of their contact list to create a quick group call.

Manage groups—An AVS subscriber can create/delete groups, add/delete members to groups and view member information.

Manage contacts—An AVS subscriber can add/delete contacts and view contact information, view the presence status of group members or contacts from the MS 120, update self presence information so that other group members can know presence status, and send a "Call Me Alert" to contacts or group members.

The following table describes the user interface screens and different options available from the BREW™ AVS client application 312:

| Component Name | Input/Output | Description |
| --- | --- | --- |
| Welcome Screen | Input | NA |
| | Output | This will display the initial welcome screen of the BREW ™ AVS client application for 5 seconds and after that user will be navigated to the "AVS" main screen automatically. |
| Main Screen | Input | The BREW ™ AVS client application is not configured. |
| | Output | The main screen will prompt the user to enter the name. |
| Main Screen | Input | The user enters the name, and the application asks whether the user wants to setup the BREW ™ AVS client application, with Yes/No options. |
| | Output | If user presses yes, then the Progress bar will be displayed indicating that the provisioning is in process. The provisioning process starts. |
| Main Screen | Input | The BREW ™ AVS client application is provisioned. |
| | Output | The BREW ™ AVS client application will display the Alert window indicating that the Provisioning is successful. |
| Main Screen | Input | The BREW ™ AVS client application is already configured. |
| | Output | The BREW ™ AVS client application will send the login request to the RTX and a "Login in Progress" screen will be displayed. |
| Login Failed | Input | The subscriber is unable to login. |
| | Output | The appropriate error screen will be displayed to the user and will display the exit button to close the application. |
| Login Successful | Input | The subscriber is logged into the network. |
| | Output | The contact screen will be displayed along with list of contacts and options. |
| (Logged in without contacts) Contact/Groups Screen | Input | The subscriber has no contacts or groups in his list. |
| | Output | The contact screen will display "No Data!" |
| (Logged in with contacts/Groups) | Input | The subscriber has some number of contacts/groups in his list. |

-continued

| Component Name | Input/Output | Description |
| --- | --- | --- |
| Contact/Groups Screen | Output | The Main screen will display the list of available contacts and groups. |
| Member Screen | Input | The user clicks a group name and the group has no members. |
| | Output | The member screen will display "No members!" |
| Member Screen | Input | The user clicks a group name and the group has one or more members. |
| | Output | The member screen will display the member name with the member icon. The member icon shows one of the following values: OFFLINE, SILENT, AVAILABLE, DO NOT DISTURB (DND), UNREACHABLE, PENDING, TRANSIENT. |
| Options Screen | Input | The contact and group screen has two soft keys, 1. Groups/Contacts 2. Back. The user clicks on the "options" button. |
| | Output | The following menu options are displayed. 1. Change avail 2. Deferred Invites 3. Change my name 4. Logoff |
| Options - change avail | Input | The user availability status can be changed. The three states are: 1. Available 2. Do not disturb 3. Silent These options are displayed on selecting this option. |
| | Output | The user availability status is changed to the selected option. An "Update Presence" (UP) message is sent out. |
| Options - Deferred Invites | Input | The user clicks on options-deferred invites option. |
| | Output | The list of deferred invitations are displayed; in the case of no deferred invitation, a message box is displayed saying "No Deferred Invitations found." |
| Options - Change my name | Input | The user clicks on "options-change my name" option and enters a new name for himself. |
| | Output | An "Update Profile" message is sent out. |
| Options - Logoff | Input | The user selects this option. |
| | Output | A "Logoff" message is sent out, and all the user interface resources are cleaned up and the application is closed. |
| Member Screen | Input | When the user is in member screen. |
| | Output | The following soft key options are displayed. 1. Options 2. Back |
| Member details | Input | From the member screen, the user selects a member and clicks on "OK." |
| | Output | The selected member's name and number are displayed. |
| Invitation screen | Input | The user receives an invitation from the RTX. |
| | Output | The invitation is notified to the user with the invitee details. The invitation screen has the following options, Defer, Accept, Reject, Group Details. |
| Invitation screen - defer | Input | The user selects the Defer option. |
| | Output | The invitation is deferred and stored in the database. |
| Invitation screen - accept | Input | The user selects the Accept option. |
| | Output | The invitation is accepted and the response is sent to the RTX. |
| Invitation screen - reject | Input | The user selects the Reject option |
| | Output | The invitation is rejected and the response is sent to the RTX. |
| Invitation screen - group details | Input | The user selects the Group Details option. |
| | Output | The invitee group's details are displayed, i.e., the list of members in the group is displayed. |

AVS Functionality

The AVS functionality provided by the BREW™ client application 312 is described in more detail below, in conjunction with FIGS. 4A-4G.

Figure 4A:
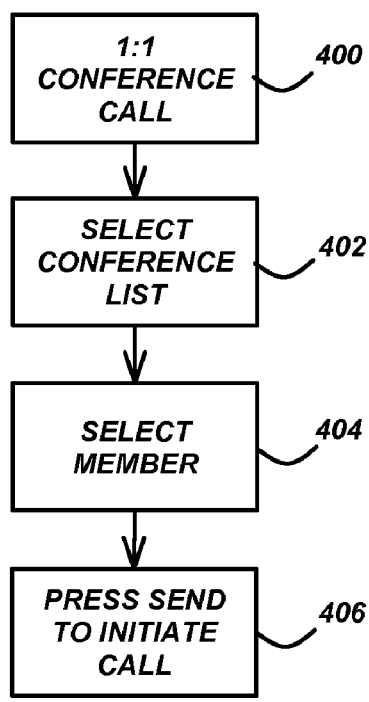
FIGS. 4A-4G illustrate the functionality provided by the BREW™ AVS client application according to the preferred embodiment of the present invention.

FIG. 4A illustrates the logic performed by the BREW™ AVS client application 312 with regard to a "1:1 Conference Call," which is invoked on the MS 120 at Block 400. Block 402 represents the user selecting a "Quick Conference" list displayed on the MS 120, Block 404 represents the user scrolling through the contacts on the "Quick Conference" list to select an entry, and Block 406 represents the user pressing the "Send" button to initiate a conference call with the selected contact. Note that a 1:1 conference call is merely a normal call. Note also that the entry in the list includes an icon indicating the presence of the contact, and calls may not be initiated to contacts that are not available to take calls.

Figure 4B:
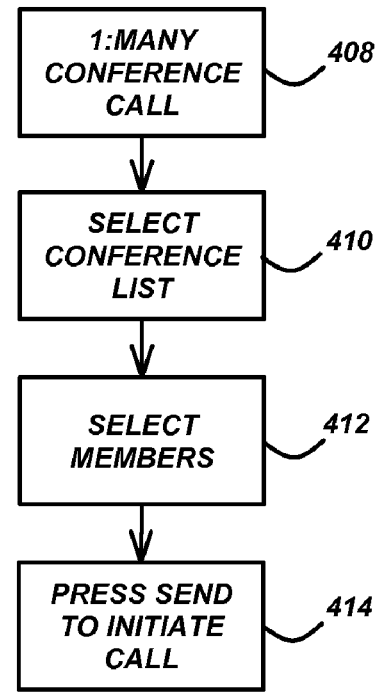

FIG. 4B illustrates the logic performed by the BREW™ AVS client application 312 with regard to a "1:Many Conference Call," which is invoked on the MS 120 at Block 408. Block 410 represents the user selecting a "Quick Conference" list displayed on the MS 120, and Block 412 represents the user scrolling through groups in the "Quick Conference" list to select a group. For example, the user may scroll to select a "Technology" Group from the list. Then, Block 414 represents the user pressing the user pressing the "Send" button to initiate a conference call with the selected group, which results in the conference call being established between the user and the members of the group.

Figure 4C:
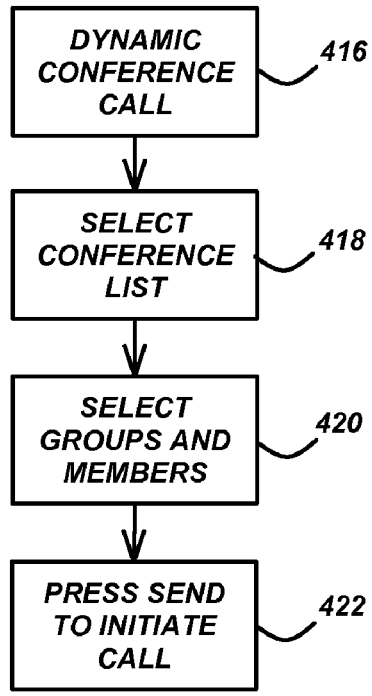

FIG. 4C illustrates the logic performed by the BREW™ AVS client application 312 with regard to a "Dynamic Conference Call," which is invoked on the MS 120 at Block 416. Block 418 represents the user selecting a "Quick Conference" list displayed on the MS 120, and Block 420 represents the user scrolling through groups in the "Quick Conference" list to select various members of various groups. For example, the user may scroll to select a "Technology" Group. Within the "Technology" group, the user may scroll to a particular member and select the member by means of a designated key, which changes an icon associated with the selected member to indicate that the member is selected as a member of the dynamic group. The user may select more members by repeating this procedure. Once the members are selected, Block 422 represents the user pressing the "Send" button to initiate a conference call with the selected members of the dynamic group, which results in the conference call being established between the user and other members of the dynamic group. Note that the member entry in the list includes an icon indicating the presence of the member, and calls may not be initiated to members that are not available to take calls.

Figure 4D:
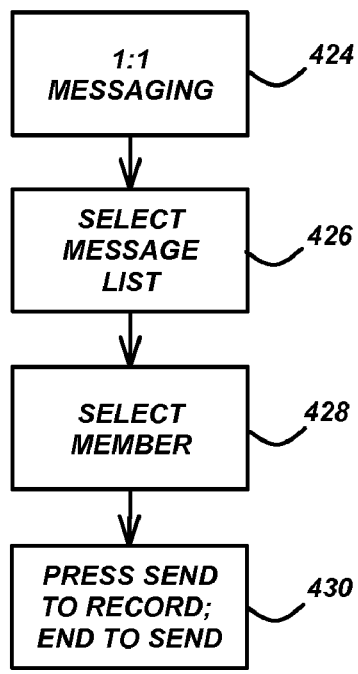

FIG. 4D illustrates the logic performed by the BREW™ AVS client application 312 with regard to "1:1 Messaging," which is invoked on the MS 120 at Block 424. Block 426 represents the user selecting a "Push-to-Message" list displayed on the MS 120, and Block 428 represents the scrolling through contacts in the "Push-to-Message" list to select a contact. Block 430 represents the user pressing the "Send" button to record the voice message, wherein the recording ends and the message is sent to the selected contact when the user presses the "End" button.

Figure 4E:
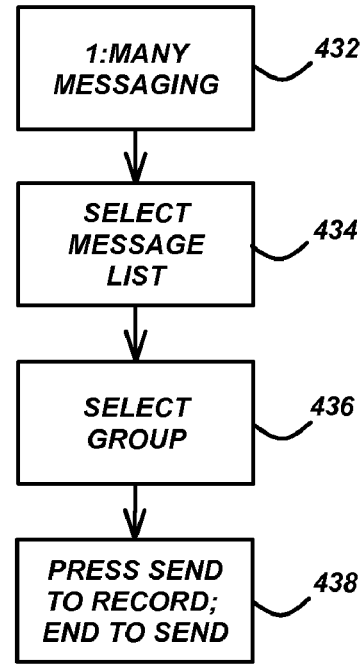

FIG. 4E illustrates the logic performed by the BREW™ AVS client application 312 with regard to "1:Many Messaging," which is invoked on the MS 120 at Block 432. Block 434 represents the user selecting a "Push-to-Message" list displayed on the MS 120, and Block 436 represents the scrolling through the "Push-to-Message" list to select a group. For example, the user may select a "Technology" Group. Then, Block 438 represents the user pressing the "Send" button to record the voice message, wherein the recording ends and the message is sent to the members of the selected group when the user presses the "End" button.

Figure 4F:
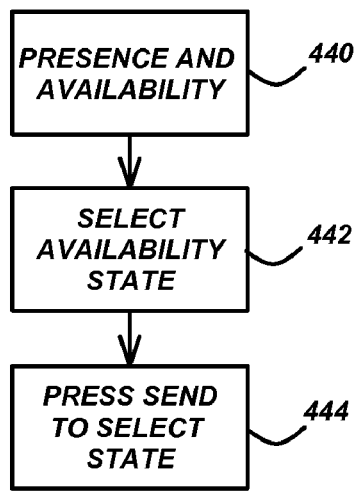

FIG. 4F illustrates the logic performed by the BREW™ AVS client application 312 with regard to "Presence and Availability," which is invoked on the MS 120 at Block 440. Block 442 represents the user selecting a "Change Availability" menu item, wherein the "Change Availability" menu provides the following availability state options: Logout, Available, and Do Not Disturb (each with their own distinctive icon). Block 444 represents the user selecting the desired availability state option and Block 446 represents the user pressing a designated key to change to that state. Note that the change in presence on the MS 120 is applied only locally.

Figure 4G:
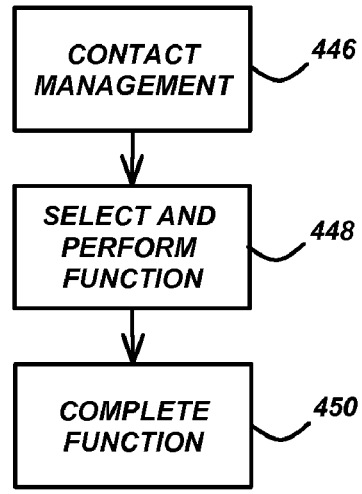

FIG. 4G illustrates the logic performed by the BREW™ AVS client application 312 with regard to "Contact Management," which is invoked on the MS 120 at Block 446. Specifically, Block 446 represents the user selecting a "Manage Contacts" menu item, wherein the "Manage Contacts" menu provides the following function options: Add New, Modify and Delete. Block 448 represents the user selecting and performing the desired function option and Block 450 represents the user pressing a designated key to complete the function. With regard to "Add New," Block 448 represents the user being prompted to enter a Name and Number, and the user entering the Name and Number, and then Block 450 represents the user pressing a designated key to complete the function. With regard to "Delete," Block 448 represents the user scrolling through a list of contacts to a desired entry, and then Block 450 represents the user pressing a designated key to complete the function. With regard to "Modify," Block 448 represents the user scrolling through a list of contacts to a desired entry, selecting the desired entry, the user being prompted to enter a Name and/or Number to modify the selected entry, and the user entering the Name and Number, and then Block 450 represents the user pressing a designated key to complete the function.

Note that, in the above figures, the particular sequence of steps, designated keys, items displayed, functions performed and prompts displayed are for illustrative purposes only. Those skilled in the art will recognize that other sequences of steps, designated keys, items displayed, functions performed or prompts displayed may be used without departing from the scope of the present invention.

CONCLUSION

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not with this detailed description, but rather by the claims appended hereto.

What is claimed is:

1. An apparatus for providing advanced voice services (AVS) in a cellular network, comprising:
    a handset for communicating with the cellular network in order to provide the advanced voice services;
    wherein the cellular network includes at least one mobile switching center and at least one real-time exchange that interfaces to the mobile switching center, to provide the advanced voice services therein, without requiring any changes to the mobile switching center or other equipment of the cellular network to provide the advanced voice services;
    wherein normal calls between the handset and other handsets are initiated by call setup and in-band signaling within the cellular network and voice frames for the calls are switched between the handset and the other handsets by the mobile switching center across bearer paths in the cellular network;
    wherein the real-time exchange providing the advanced voice services for the handset communicates with the handset using the call setup and in-band signaling of the normal calls within the cellular network, such that the mobile switching center routes an originating leg of the advanced voice services from the handset to the real-time exchange, the real-time exchange initiates one or more terminating legs of the advanced voice services to one or more of the other handsets through the mobile switching center, and the real-time exchange switches voice frames for the advanced voice services to and from the handset across the bearer paths and through the mobile switching center that switches the voice frames for both the normal calls and the advanced voice services in the cellular network; and
    wherein the handset includes a client application that is downloaded over-the-air into the handset and the client application communicates with the real-time exchange to provide the advanced voice services on the handset.

2. The apparatus of claim 1, wherein the advanced voice services comprise Push-to-Talk (P2T), Push-to-Conference (P2C), Upgrade to Conference, Push-to-Message (P2M) or Group SMS (Short Message Service).

3. The apparatus of claim 1, wherein the advanced voice services comprise One-to-One Conference Calls, One-to-Many Conference Calls, Dynamic Conference Calls, One-to-One Messaging, or One-to-Many Messaging.

4. The apparatus of claim 1, wherein the client application provides presence and availability functions on the handset, and the presence and availability functions allow a user to select among availability state options, including Logout, Available, and Do Not Disturb.

5. The apparatus of claim 1, wherein the client application provides groups and contacts management for the advanced voice services, and the groups and contacts management allow a user to add, modify or delete members and groups.

6. A method of providing advanced voice services in a cellular network, comprising:
    communicating with the cellular network using a handset in order to provide the advanced voice services;
    wherein the cellular network includes at least one mobile switching center and at least one real-time exchange that interfaces to the mobile switching center, to provide the advanced voice services therein, without requiring any changes to the mobile switching center or other equipment of the cellular network to provide the advanced voice services;
    wherein normal calls between the handset and other handsets are initiated by call setup and in-band signaling within the cellular network and voice frames for the calls are switched between the handset and the other handsets by the mobile switching center across bearer paths in the cellular network;
    wherein the real-time exchange providing the advanced voice services for the handset communicates with the handset using the call setup and in-band signaling of the normal calls within the cellular network, such that the mobile switching center routes an originating leg of the advanced voice services from the handset to the real-time exchange, the real-time exchange initiates one or more terminating legs of the advanced voice services to one or more of the other handsets through the mobile switching center, and the real-time exchange switches voice frames for the advanced voice services to and from the handset across the bearer paths and through the mobile switching center that switches the voice frames for both the normal calls and the advanced voice services in the cellular network; and wherein the handset includes a client application that is downloaded over-the-air into the handset and the client application communicates with the real-time exchange to provide the advanced voice services on the handset.

7. The method of claim 6, wherein the advanced voice services comprise Push-to-Talk (P2T), Push-to-Conference (P2C), Upgrade to Conference, Push-to-Message (P2M) or Group SMS (Short Message Service).

8. The method of claim 6, wherein the advanced voice services comprise One-to-One Conference Calls, One-to-Many Conference Calls, Dynamic Conference Calls, One-to-One Messaging, or One-to-Many Messaging.

9. The method of claim 6, wherein the client application provides presence and availability functions on the handset, and the presence and availability functions allow a user to select among availability state options, including Logout, Available, and Do Not Disturb.

10. The method of claim 6, wherein the client application provides groups and contacts management for the advanced voice services, and the groups and contacts management allow a user to add, modify or delete members and groups.

* * * * *